United States Patent Office 3,635,898
Patented Jan. 18, 1972

3,635,898
PROCESS FOR POLYMERIZATION OF ACROLEIN
Donald H. Lorenz, Basking Ridge, N.J., and David I. Randall and Joseph P. Copes, Easton, Pa., assignors to GAF Corporation, New York, N.Y.
No Drawing. Filed July 3, 1969, Ser. No. 839,058
Int. Cl. C08f 3/40
U.S. Cl. 260—67 UA
5 Claims

ABSTRACT OF THE DISCLOSURE

Polymerization of acrolein in presence of 0.5 to 9% by weight based on the total reaction mixture—of sodium sulfate in aqueous solution with a persulfate or other free radical yielding polymerization catalyst.

---

This invention relates to an improved process for the polymerization of acrolein.

It was known heretofore to polymerize acrolein with free radical yielding polymerization catalysts in aqueous or other solvent media (e.g. U.S.P.'s 3,079,357; 3,248,355; 2,657,192). The procedures hitherto disclosed ordinarily require elevated temperatures of the order of 80° C. or higher at which the molecular weight of the polymer produced is of a lower order. At lower temperatures—especially below 55° C.—the procedures hitherto known become relatively inefficient, producing low yields of polymer. For example, acrolein is polymerized only to the extent of 65% in the presence of azo bisisobutyronitrile after six days at 20° C. Redox systems including heavy metal salts have also been used to polymerize acrolein (e.g. U.S.P. 3,235,524). Thus, in the presence of potassium persulfate and silver nitrate, 100% polymerization of acrolein can be effected in 30 minutes at 20° C. However, the removal of the heavy metal residue is expensive and impractical in commercial operations.

It is an object of this invention to provide a method of polymerizing acrolein with free radical yielding polymerization catalysts at temperatures up to 55° C. without catalysts containing heavy metals, while at the same time producing high yields of polymer in a form suitable for conversion to useful derivatives.

It has been found in accordance with this invention that polymerization of acrolein in an aqueous solution containing a free radical yielding polymerization catalyst lacking any heavy metal salt when carried out in the presence of 0.5 to 9% and preferably from 2–6% of sodium sulfate at 6–55° C. and preferably 35–50° C., produces surprisingly increased yields of polyacrolein.

The polymerization is carried out in aqueous solution, the free radical yielding polymerization catalyst being employed in amounts corresponding to 0.5–20% of the weight of the monomer. The initial monomer concentration in the reaction mixture is not critical, but can be conveniently maintained at 10–20% by weight of the reaction mixture. Suitable catalysts are for example compounds containing a —O—O— or —N=N— structural linkage or capable of forming such linkage by action of dilute inorganic acids, or which otherwise produce free radicals in situ during the polymerization reaction. Typical free radical yielding catalysts not containing heavy metal salts include hydrogen peroxide, organic peroxides such as benzoyl hydroperoxide, acetyl hydroperoxide, lauroyl peroxide, di-tertiarybutyl peroxide, tertiarybutyl hydroperoxide, cumene hydroperoxide, dibenzoyl peroxide, methyl benzoyl peroxide, ethyl benzoyl peroxide, acetyl benzoyl peroxide, peracetic acid, etc.; ammonium persulfate and alkali metal persulfates such as sodium and potassium persulfates, etc.; alkali metal and ammonium percarbonates and perborates; alkyl percarbonates such as isopropyl percarbonate and butyl percarbonate, etc.; azo compounds such as 2,2-azobisisobutyronitrile, dimethyl-2,2'-azobisisobutyrate, 2,2'-azobis(2,4-dimethylvaleronitrile), 2,2'-azobisisobutyramide, etc.; trialkyl borons, such as tributylboron and trioctylboron etc. Also included in the term "free radical polymerization catalyst" are conventional water soluble redox catalysts commonly used in addition polymerization reactions containing an —O—O— structural linkage in combination with certain reducing agents. The reducing agents include for example sulfurous acid; alkyl-, alkali metal-, and ammonium sulfites; alkali metal- and ammonium bisulfites; sulfoxylates; alkyl-, alkali metal-, and ammonium nitrites; e.g. sodium bisulfite, potassium bisulfite, ammonium bisulfite, sodium sulfite, dibutyl sulfite, sodium formaldehyde sulfoxylate, sodium nitrite, potassium nitrite, ammonium nitrite and amyl nitrite.

It is also advantageous to include in the reaction mixture, a suspending agent—especially a water soluble polymer serving as a protective colloid—in order to prevent agglomeration of the insoluble polymer as it forms. A particularly effective suspending agent is vinyl pyrrolidone/vinyl acetate copolymer wherein the ratio of the copolymerized monomers is 60:40. This material has been found useful in concentrations corresponding to 0.25–2% of the weight of the monomer. Other water soluble polymers such as copolymers of maleic acid and vinylmethyl ether, or acrylic acid and its lower alkyl esters—in the form of their water soluble salts—can also be used. In addition, polyvinyl alcohol or carboxy methyl cellulose sodium salt can be used. The invention is illustrated by the following examples wherein parts and percentages are by weight and temperatures are in degree centigrade unless otherwise indicated.

EXAMPLES I

To a one liter resin flask equipped with a stirrer, thermometer, condenser and nitrogen inlet, and heated in an oil bath, there were charged 300 ml. of previously boiled deaerated distilled water, 56 grams of freshly distilled acrolein, 25 grams of sodium sulfate ($Na_2SO_4$) and 8 grams of potassium persulfate ($K_2S_2O_8$). Air was purged from the vessel by subjecting it to a vacuum and releasing to a source of nitrogen three times, and a slight superatmospheric pressure was maintained with nitrogen throughout the reaction. The mixture was heated to 45° C. while stirring. Within about ½ hour, a solid reaction product began to separate. The reaction was allowed to continue for 24 hours. The solid reaction product was in part dispersed in the reaction mixture and in part agglomerated on the walls and stirrer. The solid was filtered out and washed with distilled water until the washings no longer contained sulfate ions as indicated by treatment with barium chloride. The resulting solid polymer was dried in vacuo to constant weight, the yield being 34 grams corresponding to 60.7% of theory. The infrared spectrum of the product was identifical to that of a polymer made in the absence of sodium sulfate.

EXAMPLE II

The preceding example was repeated except that the reaction mixture included additionally 0.28 gram of a vinyl pyrrolidone/vinyl acetate copolymer in which the monomer ratio was 60:40 and having a K value of 30–50. In this case, all of the polymer formed after 24 hours remained suspended in the reaction mixture. The product was filtered off, washed with distilled water until the washings no longer indicated presence of sulfates, and the solid polymer dried to constant weight. The yield was 34.4 grams corresponding to 61.5% of theory.

EXAMPLE III

For purposes of comparison, polyacrolein was prepared in a parallel experiment wherein sodium sulfate was omitted. There were charged to a three-necked two liter flask equipped with stirrer, condenser and thermometer, 1354.4 grams of distilled deaerated water and 175.1 grams of freshly distilled acrolein. Nitrogen was bubbled through the mixture for two hours while raising the temperature to 45°. While maintaining a positive flow of nitrogen, 25 grams of potassium persulfate were added. The mixture became cloudy and after about six hours, very viscous and hard to stir. Reaction was continued for a total of 40 hours, and the product then filtered out and washed with water, the product being a fluffy white solid. Upon drying to constant weight, 61.2 grams were recovered representing a yield of 35%.

EXAMPLE IV

A series of reaction mixtures were prepared, each containing 100 ml. water, 18.7 grams distilled acrolein, 2.7 grams of potassium persulfate and 0.09 gram of the suspending agent (vinyl pyrrolidone/vinyl acetate copolymer) and respectively containing the following amounts of sodium sulfate:

| | Percent of reaction mixture |
|---|---|
| (1) 1 grams Na$_2$SO$_4$ | 0.8 |
| (2) 2 grams Na$_2$SO$_4$ | 1.6 |
| (3) 4 grams Na$_2$SO$_4$ | 3.2 |
| (4) 8.3 grams Na$_2$SO$_4$ | 6.4 |
| (5) 12.6 grams Na$_2$SO$_4$ | 9.4 |

The reaction mixtures were respectively charged to glass bottles having a capacity of 250 ml. After introducing the reaction mixtures the bottles were capped and air therein replaced by nitrogen. The bottles were then placed in a bath at 45° C. and tumbled for 20 hours. The quantity of polymer recovered by filtration, washing and drying to constant weight was obtained in the following yields:

| | Percent of theory |
|---|---|
| (1) 13.3 grams | 71 |
| (2) 12.7 grams | 68 |
| (3) 10.7 grams | 57 |
| (4) 7.6 grams | 41 |
| (5) 7.5 grams | 40 |

As compared with the foregoing, the yield in the absence of sodium sulfate—illustrated in Example III—was 35%.

The polyacrolein obtained as described in the foregoing examples can be converted to water soluble sulfite addition products by reaction with aqueous SO$_2$ as described in U.S.P. 3,235,524—such addition products finding utility in the treatment of textiles, films, hides and leather substitutes, as well as for hardening gelatin in layers employed for photographic purposes as described in U.S.P. 3,226,234.

Variations and modifications which will be obvious to those skilled in the art can be made in the foregoing procedures without departing from the scope or spirit of the invention.

We claim:
1. In a process for preparing solid polyacrolein by polymerization of acrolein in aqueous medium with a free radical yielding polymerization catalyst devoid of heavy metal salt in an amount ranging from 0.5%–20% by weight based on the weight of the acrolein, the improvement which comprises effecting such polymerization at a temperature of from 5–55° C. with inclusion of 0.5–9% by weight of sodium sulfate in the reaction mixture.

2. A process as defined in claim 1 wherein the concentration of sodium sulfate is 2–6% by weight of the reaction mixture, and the reaction temperature is 35–50° C.

3. A process as defined in claim 1 wherein the initial concentration of acrolein in the reaction mixture is 10–20% by weight.

4. A process a defined in claim 1 wherein the catalyst is a water soluble persulfate.

5. A process as defined in claim 3 wherein a water soluble organic polymer suspending agent is included in the reaction mixture in an amount ranging from 0.25 to 2% by weight of the quantity of acrolein.

References Cited

UNITED STATES PATENTS

| 2,981,725 | 4/1961 | Luft et al. | 260—94.9 D-1 |
| 3,313,750 | 4/1967 | Rink et al. | 260—17 X |
| 3,438,941 | 4/1969 | Kekish | 260—67 U |

WILLIAM SHORT, Primary Examiner

L. M. PHYNES, Assistant Examiner

U.S. Cl. X.R.

260—17 R